United States Patent [19]

Roberts et al.

[11] Patent Number: 4,637,064
[45] Date of Patent: Jan. 13, 1987

[54] LOCAL AREA NETWORK EQUALIZATION SYSTEM AND METHOD

[75] Inventors: Richard D. Roberts; William D. Walker, both of Palm Bay, Fla.

[73] Assignee: Harris Corporation, Melbourne, Fla.

[21] Appl. No.: 721,974

[22] Filed: Apr. 10, 1985

[51] Int. Cl.⁴ ..................... H04B 1/54; H04B 17/00
[52] U.S. Cl. ...................... 455/67; 455/52; 455/49; 455/68
[58] Field of Search .......... 455/2, 4, 5, 6, 49, 455/52, 67, 68, 69; 358/86; 179/18 BC; 370/85, 71, 124

[56] References Cited

U.S. PATENT DOCUMENTS

| | | |
|---|---|---|
| 2,924,703 | 2/1960 | Sichak et al. ............... 455/69 |
| 3,470,480 | 9/1969 | Smart et al. |
| 3,550,005 | 12/1970 | Whang |
| 3,559,071 | 1/1971 | Mead et al. |
| 3,566,271 | 2/1971 | Whang et al. |
| 3,648,178 | 3/1972 | Hershberg |
| 4,009,350 | 2/1972 | Cabet et al. ............. 179/15 BP |
| 4,034,296 | 7/1977 | Berenson et al. |
| 4,061,970 | 12/1977 | Magneron |
| 4,087,639 | 5/1978 | Beene et al. ............. 179/2.5 R |
| 4,201,959 | 5/1980 | Niiro et al. ................ 333/16 |
| 4,281,408 | 7/1981 | Bonnerot ................. 370/70 |
| 4,418,424 | 11/1983 | Kawamoto et al. ........... 455/4 |
| 4,495,648 | 1/1985 | Giger ..................... 455/52 |
| 4,512,033 | 4/1985 | Schrock .................... 455/4 |

Primary Examiner—Jin F. Ng
Assistant Examiner—M. Huseman
Attorney, Agent, or Firm—John L. DeAngelis, Jr.

[57] ABSTRACT

A global network equalization system for equalizing all modem receivers and modem transmitters connected to a local area network. A calibration signal is injected over the local area network from a reference or common point and received by each of the receivers. A parameter of the received signal (e.g. amplitude, power, or spectral density) is compared to a reference value and the gain of the receiver is adjusted in response thereto. When each of the receivers has been equalized, each transmitter and the associated receiver is tuned to a common vacant frequency. The transmitter transmits a signal that is then received by the associated receiver via the reference point. The received signal is compared to another reference value and the transmitter gain is adjusted in response thereto. In this way each transmitter and each receiver is equalized to the reference point of the local area network, and completely equalized communications can occur between any transmitter and receiver connected thereto.

28 Claims, 3 Drawing Figures

LOCAL AREA NETWORK EQUALIZATION SYSTEM AND METHOD

FIELD OF THE INVENTION

This invention relates generally to an equalization system, and more particularly, to a global (i.e., system-wide) network equalization system for equalizing each modem connected to a communications medium.

BACKGROUND OF THE INVENTION

One well-known medium for communicating information is the cable-television (CATV) system. The typical CATV system for communicating data includes a wire-based communications medium to which are connected a plurality of modems. Each modem includes a receiver and transmitter for receiving and sending data from that location on the CATV system to another. The system is constructed using taps, drop cables, couplers, etc., that have varying manufacturing tolerances and random lengths, producing a gain variance from one modem tap on the system to another. It is possible for this gain variation to be as high as 30 dB. To overcome these gain variations, an equalizer is inserted for each receiver and transmitter tap on the CATV system. To equalize this system a receiver tap is selected as the selected reference point, and each transmitter equalizer is manually adjusted to produce a predetermined signal level at the reference point. Then a transmit tap is selected as the reference point and a known signal is injected there. The signal level is measured at each receiver tap and the equalizer associated with each receiver is manually adjusted to provide a common signal level at each receiver. Such an equalization scheme involves considerable expense and time. Also, if a modem is moved on the CATV system, manual re-equalization thereof must be performed.

One automatic equalization technique well known in the prior art is the use of a pilot tone transmitted with an information signal. The pilot tone is compared with a fixed reference value and the result controls the gain of an amplifier to ensure that the signal level of the received signal is nearly equal to a predetermined value. A pilot tone equalization scheme of this nature is discussed in U.S. Pat. Nos. 3,648,178 and 4,281,408.

SUMMARY OF THE INVENTION

A method and apparatus for providing global network equalization of a communication system. Equalization is performed automatically when each modem is powered-up. A calibration tone is sent from a reference point and received by each powered-up receiver on the system. The received signal at each receiver is compared to a reference value and the resultant controls amplifier gain in each receiver. In this manner, each receiver is equalized to the common or reference point of the communication system. Next, each transmitter and its associated receiver is tuned to a vacant frequency, and each transmitter transmits a signal to its associated receiver via the reference point. The gain of each transmitter is then adjusted so that the signal level at each receiver is within a predetermined tolerance band.

Since all transmissions from any transmitter to any receiver pass through the reference or common point, the communication system is now globally equalized, i.e., communications from any transmitter to any receiver is equalized. The signal received by any receiver from any transmitter via the reference or common point will therefore have a signal value within a predetermined tolerance range. In various embodiments of the present invention, the signal value can represent the signal amplitude, the signal power, or the signal spectral density (i.e., signal power divided by signal bandwidth). Communications from any transmitter to any receiver is equalized. In contrast, in the prior art the communications link between a transmitter A and a receiver B is equalized to allow effective communication between them. If it is then necessary for transmitter A to communicate with a receiver C, this communications link would have to be equalized. In the present invention the equalization between each receiver and each transmitter is performed globally when each modem is powered-up.

BRIEF DESCRIPTION OF THE DRAWINGS

The present invention may be better understood, and the further advantages and use thereof more readily apparent, when considered in view of the following detailed description of exemplary embodiments, taken with the accompanying drawings in which.

DESCRIPTION OF THE PREFERRED EMBODIMENTS

Figure 1:
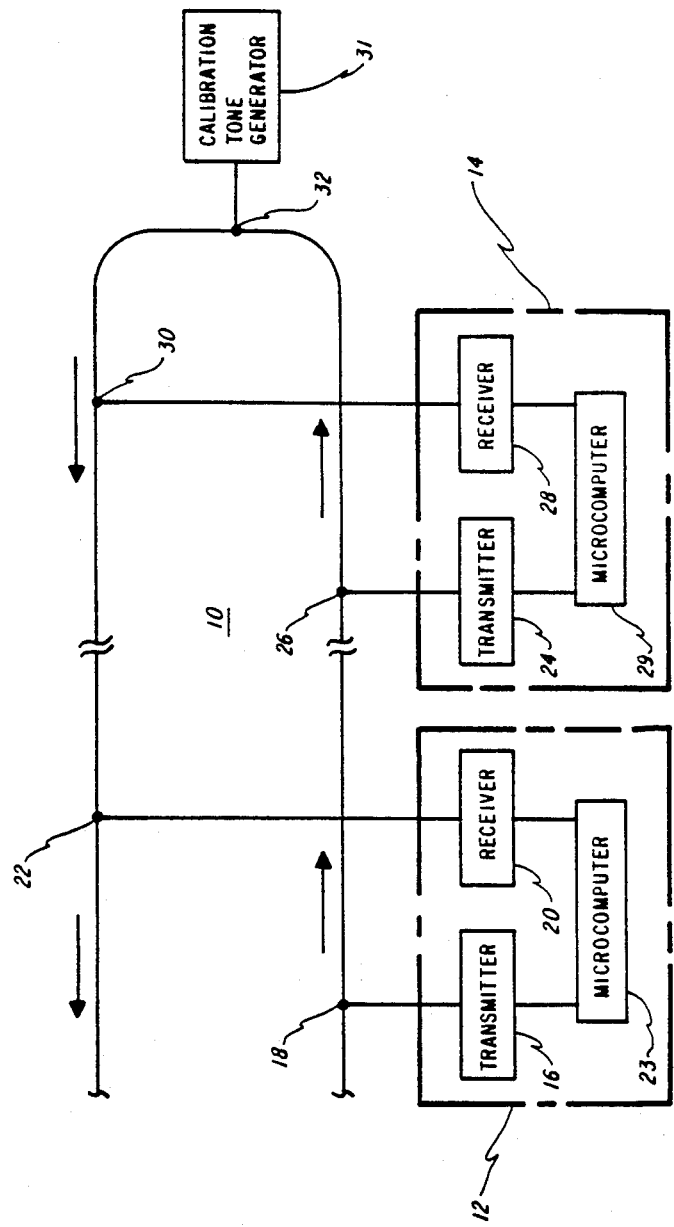
FIG. 1 is a line diagram of a CATV system suitable for use with the present invention.

Turning to FIG. 1, there is shown a local area network 10 of the type suitable for use with the global network equalization system of the present invention. The local area network 10 includes a modem 12 and a modem 14 connected thereto. The local area network 10 is shown as including only the modems 12 and 14, but can easily accommodate additional modems similar thereto. It will be recognized by those skilled in the art that a cable television system is one suitable environment for practicing the present invention. The present invention is, however, capable of implementation on any fixed transmission system where all signals are communicated via a common hub or reference point.

The modem 12 includes a transmitter 16 connected to the local area network 10 at a terminal 18, a receiver 20 connected to the local area network 10 at a terminal 22 and a microcomputer 23 for controlling the transmitter 16 and the receiver 20. The modem 14 includes a transmitter 24 connected to the local area network 10 at a terminal 26, a receiver 28 connected to the local area network 10 at a terminal 30 and a microcomputer 29 for controlling the transmitter 24 and the receiver 28. Note that the transmitted signals from the transmitter 16 and the transmitter 24 proceed to a common point 32, and then proceed in an outgoing direction for reception by the receivers 20 or 28. The local area network 10 also includes a calibration tone generator 31, to be discussed in more detail hereinafter, connected at the common point 32.

Briefly, according to the preferred embodiment the technique for communicating information on the local area network 10 uses a common or shared control channel and a plurality of data channels. Also, the modems 12 and 14 are frequency agile, meaning that each modem 12 or 14 can be automatically tuned in frequency. In the idle or normal state (i.e., during which there is no data transmission) the modems 12 and 14 are tuned to the control channel frequency. When information is to be transmitted from one modem to another, the transmitting modem examines the spectrum of data channels to find an available one. Upon locating an available data channel, the transmitting modem tunes itself to the control channel and transmits a message over the control channel to the modem with which it is desired to communicate. The message tells the receiving modem to also tune to the available data channel. Both the transmitting and receiving modems then once again check the previously located data channel for availability. If the data channel is still available, the transmitting and receiving modems engage in a brief handshake routine, after which data is exchanged. Because all data channel assignments depend upon successful use of the control channel, a prescribed control channel contention access scheme is employed to optimize use of the control channel by all users of the local area network 10 irrespective of demand. The signals carried by the local area network 10 are modulated carrier signals, at one of the plurality of data channel frequencies, modulated by an information signal. For more details of the communications scheme and the access contention scheme refer to commonly-assigned U.S. patent application Ser. No. 721,645 filed on even date herewith, and entitled "Switched Point-to-Point Local Area Network Control Mechanism."

Figure 2:
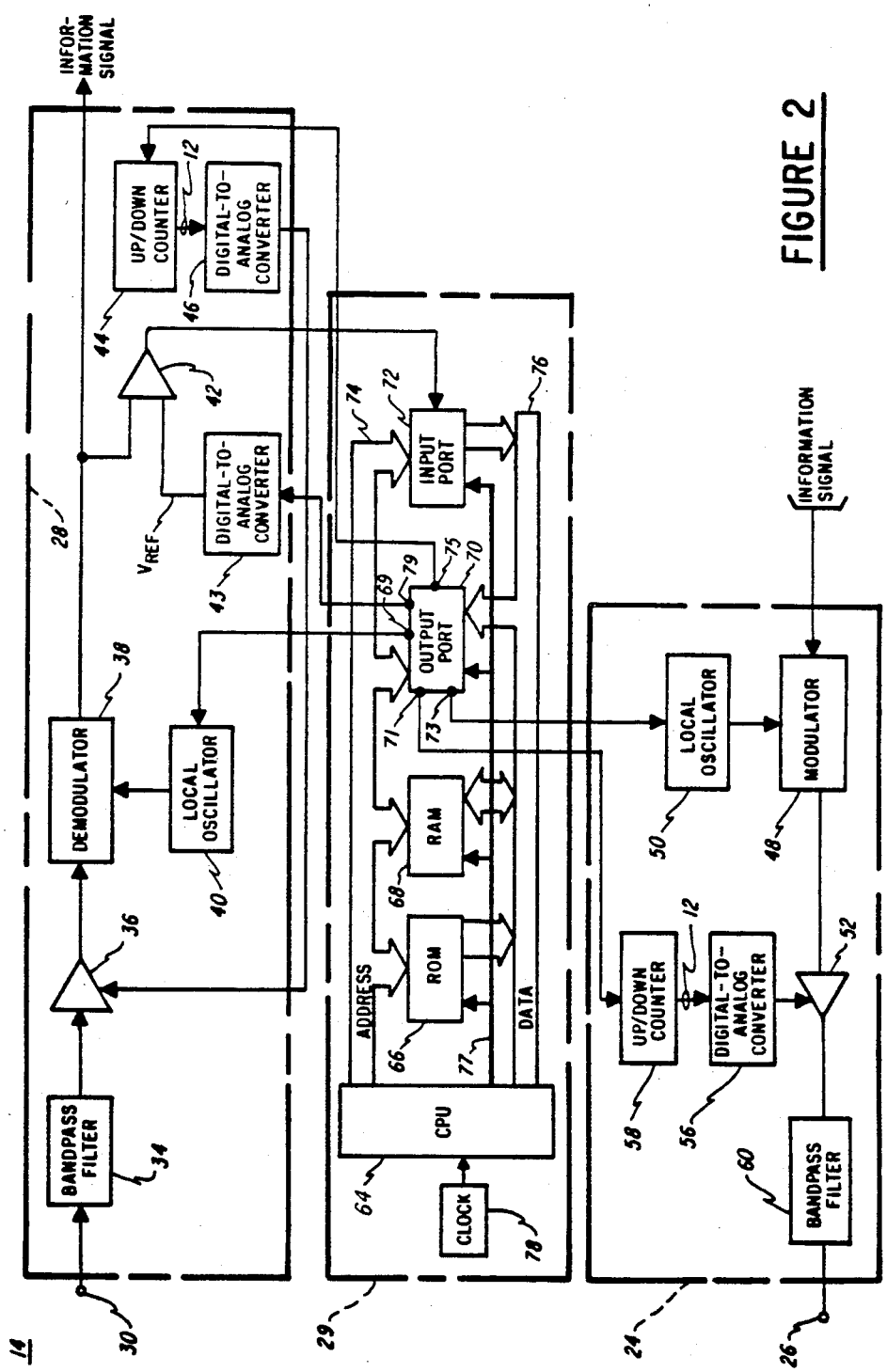
FIG. 2 is a block diagram of a global network equalization system constructed according to the teachings of the present invention, and suitable for use on the CATV system of FIG. 1.

FIG. 2 is a block diagram of the modem 14, including the receiver 28, the transmitter 24, and the microcomputer 29 of FIG. 1. The components of FIG. 2 are identical in structure and function to the components bearing identical reference characters in FIG. 1.

In FIG. 2, a bandpass filter 34, of the receiver 28, is connected to the terminal 30. A first input terminal of an amplifier 36 is connected to an output terminal of the bandpass filter 34, and an output terminal of the amplifier 36 is connected to a first input terminal of a demodulator 38. The information signal discussed in conjunction with FIG. 1 is produced at an output terminal of the demodulator 38. A second input terminal of the demodulator 38 is connected to an output terminal of a local oscillator 40. The bandpass filter 34, the amplifier 36, the demodulator 38, and the local oscillator 40, demodulate the modulated carrier signal at the terminal 30 to produce the information signal. As previously discussed, the receiver 28 is frequency agile to allow automatic tuning to the control channel frequency and to the frequency of one of the data channels. The details of the receiver 28 and the frequency-agile feature thereof are discussed in commonly assigned U.S. patent application Ser. No. 721,747 filed on even date herewith and entitled "Frequency-Agile Synchronous Demodulator."

The information signal from the demodulator 38 is also input to a first input terminal of a comparator 42. A second input terminal thereof is responsive to a reference voltage, designated $V_{REF}$, from a digital-to-analog converter 43. An output terminal of the comparator 42 is connected to an input terminal of an input port 72. A plurality of output terminals of the up/down counter 44 are connected to a plurality of input terminals of a digital-to-analog converter 46. In the embodiment of FIG. 2, the up/down counter 44 has twelve output terminals connected to twelve input terminals of the digital-to-analog converter 46. The up/down counter 44 can have any number of output terminals, dependent on the desired degree of equalization accuracy. An output terminal of the digital-to-analog converter 46 is connected to a second input terminal of the amplifier 36 for controlling the gain thereof.

When it is desired to transmit information from the modem 14 to another modem on the local area network 10, the information signal is input to a first terminal of a modulator 48 of the transmitter 24. An output terminal of a local oscillator 50 is connected to a second input terminal of the modulator 48 for providing a local oscillator signal modulated by the information signal in the modulator 48. An output terminal of the modulator 48 is connected to a first input terminal of an amplifier 52. A second input terminal of the amplifier 52 is connected to an output terminal of a digital-to-analog converter 56. The digital-to-analog converter 56 includes a plurality of input terminals connected to a plurality of output terminals of an up/down counter 58. In the embodiment of FIG. 2 the digital-to-analog converter 56 has twelve input terminals for converting a twelve-bit binary number to analog form. Digital-to-analog converters are available for converting various numbers of bits to analog form; the twelve-bit digital-to-analog converter 56 is therefore merely exemplary. An output terminal of the amplifier 52 is connected to an input terminal of a bandpass filter 60. An output terminal of the bandpass filter 60 is connected to the terminal 26 of the local area network 10 shown in FIG. 1.

The embodiment of FIG. 2 also includes the microcomputer 29. Specifically, the microcomputer 29 includes a central processing unit (CPU) 64, a read-only memory (ROM) 66, a random-access memory (RAM) 68, an output port 70, and an input port 72. The CPU 64 communicates via an address bus 74 with the ROM 66, the RAM 68, the output port 70, and the input port 72. Through control lines 77, the CPU 64 controls operation of the ROM 66, the RAM 68, the output port 70, and the input port 72. Data is transferred bi-directionally on a data bus 76 connecting the CPU 64, the ROM 66, the RAM 68, the output port 70, and the input port 72. A clock 78 provides appropriate timing signals to the CPU 64.

A terminal 69 of the output port 70 is connected to an input terminal of the local oscillator 40; a terminal 73 of the output port 70 is connected to an input terminal of the local oscillator 50; a terminal 75 of the output port 70 is connected to an input terminal of the up/down counter 44; a terminal 71 of the output port 70 is connected to an input terminal of the up/down counter 58; the terminal 79 of the output port 70 is connected to an input terminal of the digital-to-analog converter 43. Under control of the CPU 64, signals from the ouput port 70 control the local oscillators 40 and 50, and the up/down counters 44 and 58. The details of this control scheme will be discussed hereinafter. An input terminal of the input port 72 is connected to the output terminal of the comparator 42.

Note that the local area network 10 shown in FIG. 1 allows each transmitter, such as the transmitters 16 and 24 to transmit a signal to any receiver connected to the local area network 10, such as the receivers 20 and 28, including the receiver contained within the transmitting modem. Both the receivers 20 and 28, and the transmitter 16 and 24 are frequency tunable. The calibration tone generator 31, shown in FIG. 1, is a fixed frequency transmitter that places a constant amplitude signal onto the local area network 10. Note that the calibration tone generator 31 is placed at the common point 32, which serves as the calibration reference point. The tone produced by the calibration tone generator 32 may be received by any receiver connected to the local area network 10 including the receivers 20 and 28. Because the cable used in the local area network 10 exhibits frequency-dependent loss characteristics, the gain and attenuation associated with each modem, such as the modems 12 and 14, must be adjusted to compensate for losses.

Figure 3:
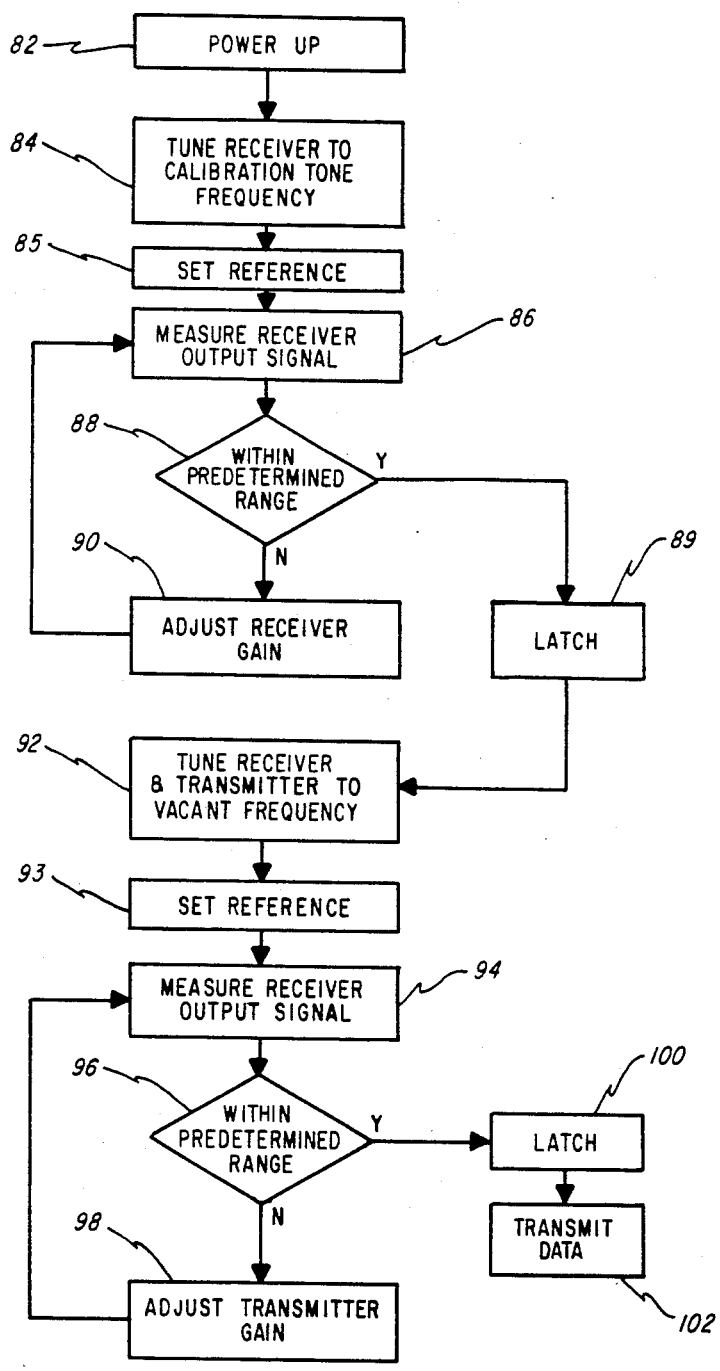
FIG. 3 is a software flow chart illustrating the programming of the microcomputer of FIG. 2.

FIG. 3 illustrates one implementation for operating the microcomputer 29 of FIG. 2. This implementation involves a software flow chart processed by the microcomputer 29 to equalize each modem, such as the modems 12 and 14, on the local area network 10. The equalization operation of the modem 14 will be described in conjunction with the flow chart of FIG. 3.

Turning to the FIG. 3 flow chart, at a step 82 the modem 14, for example, is powered up and the microcomputer 29 tunes the receiver 28 to the calibration tone frequency at a step 84. Referring to FIG. 2, this is accomplished by a signal from the terminal 69 (of the output port 70) to the local oscillator 40 of the receiver 28. The calibration tone has a predetermined energy-related parameter at the common point 32 of the local area network 10, so the signal received by the receiver 28 is perturbed by any losses on the communications medium of the local area network 10 between the common point 32 and the terminal 30 (the point at which the receiver 28 is connected to the local area network 10). The energy-related parameter can be amplitude, power, or spectral density, for example. At a step 85 the microcomputer 29 sets the reference voltage $V_{REF}$, for comparison with the energy-related parameter of the calibration signal. $V_{REF}$ is supplied to the digital-to-analog converter 43, for conversion to an analog value, via terminal 79 of the output port 70. In another embodiment not shown in FIG. 2 $V_{REF}$ can be a predetermined constant dc voltage. At a step 86 the signal from the demodulator 38 is compared with the reference signal, $V_{REF}$, in the comparator 42. The result of the comparison in the comparator 42 is input to the microcomputer 29 at the input port 72.

At a decision step 88, the microcomputer 29 determines whether the received calibration tone is within a predetermined range of the reference signal $V_{REF}$. In one embodiment of the present invention this predetermined range is plus or minus one least-significant-bit. If the response is negative, processing moves to a step 90 where the microcomputer 29 adjusts the gain of the amplifier 36 (in the preferred embodiment the microcomputer 29 increments or decrements the up/down counter 44 by one least significant bit), so as to bring the desired parameter of the received calibration tone closer to that of the reference signal $V_{REF}$. Referring to FIG. 2, this is accomplished by a signal from the terminal 75 of output port 70 to the up/down counter 44. The signal causes the up/down counter 44 to increment or decrement based on the result of the decision step 88. The count from the up/down counter 44 is input to the digital-to-analog converter 46, where it is converted to an analog signal for controlling the amplifier 36. The microcomputer 29 continues processing through the steps 86 through 90 until the received calibration tone is within the predetermined range, i.e., until the result of the decision step 88 is affirmative. Processing then moves to a step 89 where the count of the up/down counter 44 is latched to fix the gain of the amplifier 36.

Since the reference voltage $V_{REF}$ used to calibrate the receiver 28 is the same value as that used to calibrate all receivers connected to the local area network 10, the output signal from the demodulator of each calibrated receiver will have the same energy-related parameter value (e.g., amplitude, power, or spectral density) when receiving the calibration tone; that is, each receiver is equalized with respect to the calibration tone and therefore with respect to all signals received via the common point 32. It is well known in the art that in another embodiment of the present invention the up/down counters 44 and 58 can be eliminated and their functions performed by software for operating the microcomputer 29.

At a step 92 of FIG. 3, the microcomputer 29 tunes the receiver 28 and the transmitter 24 to the same vacant frequency. Tuning of the receiver 28 is accomplished by a signal from the terminal 69, of the output port 70, to the local oscillator 40; tuning of the transmitter 24 is accomplished with a signal from the terminal 73 of the output port 70, to the local oscillator 50. At a step 93, the microcomputer 29 adjusts the reference signal $V_{REF}$ to a predetermined value. At a step 94, the transmitter 24 transmits a predetermined signal to the receiver 28. The transmitted signal is processed through the demodulator 38 and the output signal therefrom is compared to the reference signal $V_{REF}$ in the comparator 42. The result thereof is input to the input port 72. At a decision step 96 the microcomputer 29 determines if the receiver output signal is within a predetermined range of the reference signal $V_{REF}$. In the preferred embodiment this predetermined range is plus or minus one least-significant-bit. If the answer is negative the microcomputer 29 adjusts the gain of the amplifier 52 at a step 98. In the FIG. 2 embodiment, this is accomplished by a signal from the terminal 71 of the output port 70 to the up/down counter 58, causing the latter to increment or decrement one least-significant-bit. The up/down counter 58 increments or decrements based upon the relationship between the signal from the demodulator 38 and the reference value $V_{REF}$, until these signals are within a predetermined range. When this occurs the local area network 10 is equalized, and processing moves to a step 100 where the up/down counter 58 is latched to fix the gain of the amplifier 52. Processing then moves to a step 102, indicating that the local area network 10 is equalized and ready to communicate data. If the reference value used to calibrate the transmitter 24 is the same for all transmitters of the local area network 10, then each transmitted signal will have the same amplitude at the common point 32 and all transmitters are therefore equalized.

All transmitters and receivers of the local area network 10 are now equalized to the same reference point, that is, the common point 32, and hence the local area network 10 is equalized within a band of frequencies about the calibration tone. In one embodiment of the present invention, equalization relates to the power of each signal transmitted over the local area network 10. That is, the reference values $V_{REF}$ are determined such that the signal power for each signal received by a modem receiver is the same. Note that the equalization is accomplished in two stages. First the transmission medium from the common point (the common point 32 in FIG. 1) is equalized by transmitting a calibration tone from the common point to each modem receiver. The transmission path from each modem transmitter to the common point is equalized by transmitting the signal from a modem transmitter to an associated modem receiver via the common point, and adjusting the transmitter gain to a predetermined value. When the local area network 10 is equalized, the signal from any transmitter will have the same power level at any receiver.

In another embodiment of the present invention, rather than equalizing on the basis of signal power, the equalization is accomplished on the basis of spectral density. The spectral density is defined as the power of a given signal divided by the bandwidth of that signal. The spectral density equalization criteria takes account of the limited power-handling capabilities of any repeaters (none shown in FIG. 1) of the local area network 10, and ensures that when all the available system power has been utilized, all the available bandwidth will also have been utilized. In still another embodiment, equalization can be performed using signal magnitudes or amplitudes.

The discussion of the software flow charts illustrated in FIG. 3 is intended for purposes of illustration and not limitation. It is anticipated that alternative embodiments of the present invention may be conceived wherein the location of the instructions for performing the equalization is different from that shown in the discussed flow chart. These alternative embodiments are believed to fall within the spirit and scope of the present invention as claimed hereinafter.

In one embodiment of the present invention, the modems, such as the modems 12 and 14, connected to the local area network 10 can communicate in one of six frequency bands, with each band including a plurality of data channels. The equalization must be established depending on the operating frequency band of the modem. By placing a calibration tone at the frequency where the first and second bands meet, another at the frequency where the third and fourth bands meet, and a third at the frequency where the fifth and sixth bands meet, the equalization can be accomplished using three calibration tones. In other embodiments of the present invention, any number of calibration tones and frequency bands can be used for the modems connected to the local area network 10.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are obvious to one of ordinary skill in the art.

What is claimed is:

1. In a communications network including a plurality of gain-adjustable transmitters, a plurality of gain-adjustable receivers, and a communications medium, wherein each one of said plurality of gain-adjustable transmitters is associated with one of said plurality of gain-adjustable receivers and wherein the plurality of transmitters and receivers communicate with each other via the communications medium, said communications network comprising:

means for providing a calibration signal at a common point of the communications medium;

means responsive to said calibration signal for adjusting the gain of at least one of the plurality of receivers as a function of a preselected characteristic of said calibration signal;

means for enabling the transmitter associated with said at least one receiver to transmit a test signal to said at least one receiver via said common point; and means in said at least one receiver for receiving said test signal and for adjusting the gain of said transmitter associated with said at least one receiver as a function of a preselected characteristic of said test signal received by said at least one receiver.

2. The communications network of claim 1 wherein the preselected characteristic is signal amplitude.

3. The communications network of claim 1 wherein the preselected characteristic is signal power.

4. The communications network of claim 1 wherein the preselected characteristic is signal spectral density.

5. In a communications network including a plurality of gain-adjustable transmitters, a plurality of associated gain-adjustable receivers, and a communications medium, wherein each one of said plurality of gain-adjustable transmitters is associated with one of said plurality of gain-adjustable receivers, and wherein the plurality of transmitters and receivers communicate with each other via a common point of the communications medium, said communications network comprising:

means for providing a calibration signal at the common point, wherein said calibration signal propagates over the communications medium for reception by at least one of the plurality of receivers;

means responsive to said calibration signal for adjusting the gain of said at least one receiver to compensate for signal degradation between the common point and the receiver;

means for enabling the transmitter associated with said at least one receiver to transmit a test signal to said at least one receiver via the common point; and means responsive to said test signal for adjusting the gain of said transmitter associated with said at least one receiver to compensate for signal degradation between said transmitter associated with said at least one receiver and the common point.

6. A communications network including a communications medium, a plurality of gain-adjustable transmitters, wherein each one of the plurality of transmitters has an associated gain-adjustable receiver, and wherein the plurality of transmitters and receivers communicate with each other via a common point of the communications medium, and wherein the communications network comprises;

means for injecting a calibration signal at the common point;

means for tuning at least one of the plurality of receivers to receive said calibration signal;

wherein the tuned receiver produces a first received signal in response to said calibration signal;

means for producing a first reference signal;

means for comparing said first received signal with said first reference signal and for adjusting the gain of the tuned receiver in response thereto;

means for tuning the tuned receiver and the transmitter associated therewith to an unused frequency;

wherein the tuned transmitter transmits a test signal to the associated tuned receiver, via the common point;

wherein the tuned receiver produces a second received signal in response to said test signal;

means for producing a second reference signal; and means for comparing said second received signal with said second reference signal and for adjusting the gain of the tuned transmitter in response thereto.

7. The communications network of claim 6 wherein the first and the second reference signals represent signal amplitude.

8. The communications network of claim 6 wherein the first and the second reference signals represent signal power.

9. The communications network of claim 6 wherein the first and the second reference signals represent signal spectral density.

10. The communications network of claim 6 wherein the first reference signal represents a predetermined threshold value, and wherein the means for comparing the first received signal with the first reference signal includes:
   means for comparing the first received signal with the first reference signal and for producing a comparison signal representing the difference between the first received signal and the predetermined threshold value;
   control means responsive to said comparison signal for controlling the gain of the tuned receiver until said comparison signal indicates that the first received signal is substantially equal to the predetermined threshold value.

11. The communications network of claim 10 wherein the control means includes:
   up/down counter means for producing a binary count of N bits, wherein said binary count is incremented when the comparison signal indicates that the first received signal is less than the predetermined threshold value, and wherein said binary count is decremented when the comparison signal indicates that the first received signal is greater than the predetermined threshold value; and
   digital-to-analog converter means responsive to said binary count for producing an analog signal representative thereof, wherein said analog signal controls the gain of the tuned receiver.

12. The communications network of claim 10 wherein the control means includes:
   up/down counter means for producing a binary count of N bits, wherein said binary count is decremented when the comparison signal indicates that the first received signal is less than the predetermined threshold value, and wherein said binary count is incremented when the comparison signal indicates that the first received signal is greater than the predetermined threshold value; and
   digital-to-analog converter means responsive to said binary count for producing an analog signal representative thereof, wherein said analog signal controls the gain of the tuned receiver.

13. The communications network of claim 6, wherein the second reference signal represents a predetermined threshold value, and wherein the means for comparing the second received signal with the second reference signal includes:
   means for comparing the second received signal with the second reference signal and for producing a comparison signal representing the difference between the second received signal and the predetermined threshold value;
   control means responsive to said comparison signal for controlling the gain of the tuned transmitter until said comparison signal indicates that the test signal is substantially equal to the predetermined threshold value.

14. The communications network of claim 13 wherein the control means includes;
   up/down counter means for producing a binary count of N bits wherein said binary count is incremented when the comparison signal indicates that the second received signal is less than the predetermined threshold value and wherein said binary count is decremented when the second comparison signal indicates that the second received signal is greater than the predetermined threshold value; and
   digital-to-analog converter means responsive to said binary count for producing an analog signal representing said binary count, wherein said analog signal controls the gain of the tuned transmitter.

15. The communications network of claim 13 wherein the control means includes:
   up/down counter means for producing a binary count of N bits wherein said binary count is decremented when the comparison signal indicates that the parameter of the second received signal is less than the predetermined threshold value and wherein said binary count is incremented when the second comparison signal indicates that the second received signal is greater than the predetermined threshold value; and
   digital-to-analog converter means responsive to said binary count for producing an analog signal representing said binary count, wherein said analog signal controls the gain of the tuned transmitter.

16. A broadband communications network, including a communications medium, a plurality of gain-adjustable transmitters wherein each one of the plurality of transmitters has an associated gain-adjustable receiver, and wherein the plurality of transmitters and receivers communicate with each other over one of a plurality of adjacent frequency bands via a common point of the communications medium, said broadband communications network comprising:
   means for injecting a calibration signal at the common point, wherein the frequency of said calibration signal is adjacent to two of the plurality of adjacent frequency hands;
   means for tuning at least one of the plurality of receivers to the frequency of said calibration signal, wherein the tuned receiver produces a first received signal representative of said calibration signal;
   means for producing a first reference signal;
   means for comparing said first received signal with said first reference signal and for adjusting the gain of the tuned receiver in response thereto;
   means for tuning the tuned receiver and the transmitter associated therewith to an unused frequency;
   wherein the tuned transmitter transmits a test signal to the associated tuned receiver, via the common point;
   wherein the tuned receiver produces a second received signal representative of said test signal;
   means for producing a second reference signal; and
   means for comparing said second received signal with said second reference signal and for adjusting the gain of the tuned transmitter in response thereto such that the tuned transmitter and the tuned receiver are equalized for communications in either of the adjacent frequency bands.

17. A method for equalizing signals transmitted over communications medium, said method comprising the steps of:
   (a) establishing a common point on the communications medium;
   (b) locating at least one receiver such that any signal received thereby must pass through said common point;
   (c) adjusting the gain of said at least one receiver to compensate for, signal degradation between said common point and said at least one receiver;
   (d) locating at least one transmitter such that any signal transmitted therefrom must pass through said common point; and
   (e) adjusting the gain of said at least one transmitter to compensate for signal degradation between said at least one transmitter and said common point.

18. The method of claim 17 wherein step (c) includes the steps of:
   (c1) receiving a calibration signal at said common point; and
   (c2) adjusting the gain of the at least one receiver such that a characteristic of said calibration signal has a value substantially equal to a predetermined reference characteristic after processing through the at least one receiver.

19. The method of claim 17 wherein step (e) includes the step of:
   (e1) adjusting the gain of the at least one transmitter such that any signal transmitted therefrom has a characteristic substantially equal to a predetermined reference characteristic at said common point.

20. A method for equalizing signals transmitted over a communications network, including a communications medium, a plurality of gain-adjustable transmitters, and a plurality of gain-adjustable receivers, wherein each one of said plurality of gain-adjustable transmitters is associated with one of said plurality of gain-adjustable receivers, and wherein the plurality of transmitters and receivers communicate with each other via a communications medium, said method comprising the steps of:
   (a) providing a calibration signal on the communications medium via a common point thereof, wherein all signals on the communications medium pass through said common point;
   (b) adjusting the gain of at least one of the plurality of receivers as a function of a preselected characteristic of said calibration signal;
   (c) enabling the transmitter associated with said at least one receiver to transmit a test signal to said at least one receiver via the communications medium; and
   (d) said at least one receiver receiving said test signal and adjusting the gain of said transmitter associated with said at least one receiver as a function of a preselected characteristic of said test signal received by said at least one receiver.

21. A method for equalizing signals transmitted over a communications medium, said method comprising the steps of:
   establishing a common point on the communications medium;
   locating at least one receiver such that any signal received thereby must pass through said common point;
   receiving a calibration signal at said common point;
   adjusting the gain of said at least one receiver such that a characteristic of said calibration signal has a value substantially equal to a predetermined reference characteristic after processing through said at least one receiver;
   locating at least one transmitter such that any signal transmitted therefrom must pass through said common point; and
   adjusting the gain of said at least one transmitter such that any signal transmitted therefrom has a characteristic substantially equal to a predetermined reference characteristic at said common point.

22. The method of claim 21 wherein the characteristic of the calibration signal and the characteristic of the signal transmitted from the transmitter is amplitude.

23. The method of claim 21 wherein the characteristic of the calibration signal and the characteristic of the signal transmitted from the transmitter is power.

24. The method of claim 21 wherein the characteristic of the calibration signal and the characteristic of the signal transmitted from the transmitter is spectral density.

25. A method for equalizing signals transmitted over a communications medium, said method comprising the steps of:
   establishing a common point on the communications medium;
   locating at least one receiver such that any signal received thereby must pass through said common point;
   producing a calibration signal at said common point;
   adjusting the gain of said at least one receiver such that a characteristic of said calibration signal has a value substantially equal to a predeterminbed reference characteristic after processing through said at least one receiver;
   locating at least one transmitter such that any signal transmitted therefrom must pass through said common point; and
   adjusting the gain of said at least one transmitter such that any signal transmitted therefrom has a characteristic substantially equal to a predetermined reference characteristic at said at least one receiver.

26. The method of claim 25 wherein the characteristic of the calibration signal and the characteristic of the signal transmitted from the transmitter is amplitude.

27. The method of claim 25 wherein the characteristic of the calibration signal and the characteristic of the signal transmitted from the transmitter is power.

28. The method of claim 25 wherein the characteristic of the calibration signal and the characteristic of the signal transmitted from the transmitter is spectral density.

* * * * *